(12) United States Patent
Haubs et al.

(10) Patent No.: US 7,022,805 B2
(45) Date of Patent: Apr. 4, 2006

(54) PROCESS FOR THE PREPARATION OF ACETAL POLYMERS

(75) Inventors: Michael Haubs, Bad Kreuznach (DE); Stanislaw Penczek, Lodz (PL)

(73) Assignee: Ticona GmbH, (DE)

( * ) Notice: Subject to any disclaimer, the term of this patent is extended or adjusted under 35 U.S.C. 154(b) by 0 days.

(21) Appl. No.: 10/939,136

(22) Filed: Sep. 10, 2004

(65) Prior Publication Data
US 2005/0059797 A1    Mar. 17, 2005

(30) Foreign Application Priority Data
Sep. 12, 2003    (EP)    ................... 03020755

(51) Int. Cl.
*C08G 2/06*    (2006.01)

(52) U.S. Cl. ........... 528/242; 528/249; 528/408; 526/193

(58) Field of Classification Search ........... 528/242, 528/249, 408; 526/193
See application file for complete search history.

(56) References Cited

U.S. PATENT DOCUMENTS

| 3,337,503 | A | * | 8/1967 | Schnizer et al. ........... 528/241 |
| 3,454,683 | A | * | 7/1969 | Kampe et al. ............. 558/73 |
| 5,013,805 | A | * | 5/1991 | Wang ........................ 526/264 |
| 5,994,455 | A |   | 11/1999 | Muck et al. |

FOREIGN PATENT DOCUMENTS

EP    0 678 535    10/1995

OTHER PUBLICATIONS

Kim et al, "Phosphonic acid esters as thermally latent initiators: Initiaton process in the polymerization of glycidyl phenyl ether" Macromol. Chem. Phys., 2000, 201, 1691-1695.*

Kamigaito et al, "Living Cationic Polymerization of Vinyl Ethers . . . Phosphoric and Phosphinic Acids/Zinc Chloride Initiating Systems for Isobutyl Vinyl Ether", Journal of Polymer Science: Pt. A: Polymer Chemistry, vol. 31, 2987-2994 (1993).*

* cited by examiner

*Primary Examiner*—Fred Teskin
(74) *Attorney, Agent, or Firm*—Connolly Bove Lodge & Hutz

(57) ABSTRACT

The present invention relates to a process for the preparation of acetal polymers, in particular of polyoxymethylene (POM) by cationic polymerization where organophosphonic and/or organophosphinic acids and/or their derivatives and/or their precursors are used as the initiator.

21 Claims, No Drawings

PROCESS FOR THE PREPARATION OF ACETAL POLYMERS

The present invention relates to a process for the preparation of acetal polymers, in particular of polyoxymethylene (POM) by cationic polymerization where organophosphonic and/or organophosphinic acids and/or their derivatives and/or their precursors are used as the initiator.

Thermoplastic molding materials of POM homopolymers and copolymers have long been known as versatile construction materials. In many cases they can be used as a substitute for metals because of their outstanding mechanical properties, such as high rigidity, hardness and strength. At the same time they can be molded to strict tolerance limits. The good resistance of POM to many chemicals opens further applications, especially where stability to gasoline or organic solvents is required.

POM copolymers can be manufactured by the cationic polymerization of cyclic formals or cyclic acetals such as 1,3,5-trioxane (trioxane) or tetroxane in the presence of comonomers such as ethylene oxide or other cyclic ethers or cyclic acetals such as or 1,3-dioxolane. The comomonomer content is typically in the range of from 0.5 to 25% by weight; preferred is the range of from 3 to 6% by weight. The copolymers exhibit enhanced stability over the homopolymers and are much more stable towards basic compounds.

Polymerization is conducted by the addition of an initiator to a reaction mixture comprising cyclic formals, comonomers, and optionally linear formals such as methylal as molecular weight regulators. The initiator does not only start the polymerization reaction but also has a pronounced influence on chain transfer and chain termination reactions. Therefore, the initiator is of paramount importance for the productivity of polymer formation as well as for polymer properties.

As cationic initiator all such compounds can be used that react with the cyclic acetals or cyclic ethers to form oxocarbenium and/or oxonium compounds. Typical initiators are strong Bronstedt and Lewis acids, such as perchloric acid, trifluoromethanesulfonic acid or boron trifluoride (U.S. Pat. No. 5,994,455). Acid anhydrides can also be used. In some cases, esters can initiate the polymerization of cyclic ethers. One such ester is methyl-(trifluoromethane)sulfonate (EP 0 678 535 A1).

The initiator should be active in very small concentrations, so that after the desactivation of the initiator at the end of the polymerization reaction it is not necessary to separate the deactivated initiator from the polymer.

While currently used initiators have a good polymerization activity, they also cause side reactions like hydride shift of the growing polymer chain which limits the molecular weight of the polymers and increases the amount of unstable formate end groups. Unstable end groups are responsible for the thermal instability of the polymers.

The object of this invention is therefore to provide an initiator which
has a high polymerization activity
produces high molecular weight polymer
produces a thermally stable polymer with very few unstable end groups It has been found that high molecular weight POM polymers with high thermal stability can be produced conveniently and in high yield if the initiator contains an organophosphinic acid or its derivatives of the general structure (I) or an organophosphonic acid or its derivatives of the general structure (II).

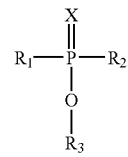

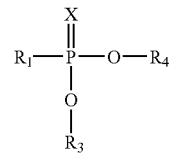

where $R_1$ and $R_2$ are $CF_3-(CF_2)_n-$, with n=0–10,
$R_3$ and $R_4$ are H, an alkyl group or an aryl group and
X is O, NH or NR, with R representing an alkyl group or an aryl group.

Another object of tht invention is for the use of organophosphonic acid, and/or organophosphinic acid and/or their derivatives and/or their precursors as initiators for the cationic polymierization or copolymerization of monomers such as cyclic formals or cyclic acetals or mixtures thereof.

The term initiator extends to a single compound or to a mixture of compounds. This mixture may also contain organophosphorous compounds that are precursors of compounds with general structures I and II. Precursors are all such compounds that under the reaction conditions are converted by a chemical reaction to compounds with general structures I and II. The precursors may either react with components that have deliberately been added to the reaction mixture or are inevitably present in the reaction mixture such as traces of water or methanol. Typical examples for precursors are acid anhydrides, acid halogenides, acid phenolates or acid imidazolides.

The concentration of the initiator is typically from 0.01 to 50 ppm by weight based on the monomer. Preferred initiator concentrations range from 0.1 to 5 ppm. In order to distribute these small quantities of initiator quickly and homogeneously in the reaction mixture it has proven useful to premix the initiator with an inert solvent and then add it to the monomers. Examples for inert solvent are 1,4-dioxane, dimethoxyethane or dimethyleneglycol dimethyl ether. The use of additional solvents can be avoided if the initiator is premixed with methylal, which is commonly used as a molecular weight regulator (U.S. Pat. No. 5,994,455).

The polymerization can be performed in bulk, in solution or in the melt. In the first two instances, polymer precipitates out of the polymerization mixture during polymerization. The polymerization temperatures range from –20 to 100° C. for solution polymerization, from 20° C. to 150° C. for bulk polymerization and from 100° C. to 200° C. for melt polymerization. At the end of each of these polymerization reactions, the reaction mixture is deactivated by the addition of compounds that terminate the active polymer chain. Typical deactivators are organic bases. Examples are triethylamine or melamine.

Weight average molecular weights of the POM polymers can be quite high. It is possible to obtain molecular weights of up to 200,000. The molecular weight of the polymers can be adjusted by the addition of regulators to the reaction mixture. Convenient regulators are linear formals such as methylal. Depending on the amount of regulator used the molecular weight ranges from 10,000 to 200,000.

The following examples illustrate the invention but are not intended to limit the invention in any way.

Bis(trifluoromethyl)phosphinic acid, bis(pentafluoroethyl)phosphinic acid, trifluoromethyl phosphonic acid and pentafluoroethyl phosphonic acid were purchased from Hansa Fine Chemicals (Bremen, Germany, www.hfc-chemicals.com) and used as received.

Melt Volume Ratios (MVR) were measured according to ISO 1133 at 190° C. and 2.16 kg. The amount of unstable end groups was determined by measuring the amount of formaldehyde formed during 1 hour at 190° C. under alkaline (pH=9.5) conditions by titrating the formaldehyde formed using the sulfite method. Weight average molecular weights were determined by viscosimetry at 140° C. in γ-butyrolactone as disclosed by D. Braun, U. Brückner, P. Eckardt, M. Hoffmockel, Angew. Makromol. Chem. 265 (1999), 55.

EXAMPLE 1

A mixture of 95 g of 1,3,5-trioxane and 5 g of 1,3-dioxolane was mixed with 1 ppm by weight, based upon the total weight of 1,3,5-trioxane and 1,3-dioxolane, of bis(trifluoromethyl)phosphinic acid, which was employed as a 0.1% by weight solution in 1,4-dioxane. The polymerization was run at 80° C. for 4 minutes. The solidified reaction mixture was quenched with 400 g of water (containing 1,000 ppm of triethylamine) in a blender and subsequently hydrolyzed at 170° C. in a mixture of water and methanol (10/90 by volume). Upon cooling to room temperature the polymer precipitated. It was filtered and dried under nitrogen at 50° C.

The polymer was analyzed for MVR and unstable end groups. The MVR was 5 ml/10 min, and the amount of unstable formate end groups was <0.1% by weight.

EXAMPLE 2

The experiment of example 1 was conducted in the same way, except that 1 ppm of bis(pentafluoroethyl)phosphinic acid was used as the initiator. Analysis of the polymer gave an MVR of 7 ml/10 min and the amount of unstable endgroups was <0.1%.

The invention claimed is:

1. A process for the formation of acetal homopolymers or copolymers by cationic polymerization of monomers characterized in that organophosphonic acid, and/or organophosphonic acid and/or their derivatives, and/or their precursors are used as the polymerisation initiator and wherein organophosphonic acid and its derivatives have a structure according to the general formula (I), and organophosphonic acid and its derivatives have a structure according to the general formula II,

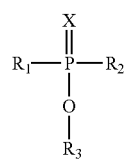
(I)

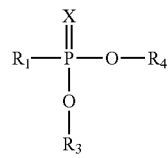
(II)

where $R_1$ and $R_2$ are $CF_3-(CF_2)_n-$, with n=0–10, $R_3$ and $R_4$ are H, an alkyl group or an aryl group and X is O, NH or NR, with R representing an alkyl group or an aryl group.

2. A process as claimed in claim 1, where the monomers are polymerised in the presence of comonomers.

3. A process as claimed in claim 1, where the monomers and/or comonomers are polymerised in the presence of a molecular weight regulator.

4. A process as claimed in claim 2, where said monomers are cyclic acetals and said comonomers include cyclic ethers and/or cyclic acetals that are different from the cyclic acetals used as monomers.

5. A process as claimed in claim 2, where comonomers include one or several of the following compounds: ethylene oxide, 1,3-dioxolane, 1,3-dioxane and tetroxane.

6. A process as claimed in claim 1, where the total concentration of initiator and/or precursor is in the range of from 0.01 ppm to 50 ppm by weight, based on the monomer or the monomer/comonomer mixture.

7. A process as claimed in claim 1, wherein the initiator contains bis(trifluoromethyl)phosphinic acid.

8. A process as claimed in claim 1, wherein the initiator contains bis(pentafluoroethyl)phosphinic acid.

9. The process as claimed in claim 1, wherein said monomers are cyclic formals or cyclic acetals or mixtures thereof.

10. A process as claimed in claim 9, wherein the cyclic formal is 1,3,5-trioxane.

11. A process as claimed in claim 9, wherein linear formals are used as molecular weight regulators.

12. A process as claimed in claim 11, wherein said linear formal is methylal.

13. A process for the cationic polymerization or copolymerisation of monomers which comprises polymerizing using an initiator which is (1) an organophosphonic acid and its derivative and its precursor of the general formula (I)

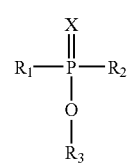
(I)

where $R_1$ and $R_2$ are $CF_3-(CF_2)_n-$, with n=0–10,

R₃ and R₄ are H, an alkyl group or an aryl group and
X is O, NH or NR, with R representing an alkyl group or an aryl group or (2) an organophosphonic acid and its derivative and its precursor of the general formula (II)

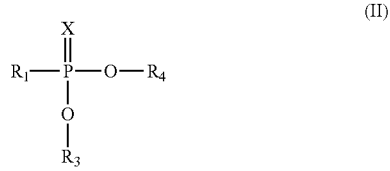

where R₁ is CF₃—(CF₂)ₙ—, with n=0–10,
R₃ and R₄ are H, an alkyl group or an aryl group and
X is O, NB or NR, with the R representing an alkyl group or an aryl group.

14. The process as claimed in claim 13, wherein said monomers are cyclic formals or cyclic acetals or mixtures thereof.

15. The process as claimed in claim 13, wherein the monomers are polymerised in the presence of comonomers and/or in the presence of a molecular weight regulator.

16. The process as claimed in claim 13, wherein said monomers are cyclic acetals and the comonomers are cyclic ethers and/or cyclic acetals that are different from the cyclic acetals used as the monomers.

17. The process as claimed in claim 13, wherein comonomers include one or several of the following compounds: ethylene oxide, 1,3-dioxolane, 1,3-dioxane and tetroxane.

18. The process as claimed in claim 13, wherein the organophosphonic acid derivative is bis(trifluoromethyl) phosphinic acid and/or bis(pentafluoroethyl)phosphinic acid.

19. The process as claimed in claim 14, wherein the cyclic formal is 1,3,5-trioxane.

20. The process as claimed in claim 15, wherein said molecular weight regular is a linear formal.

21. The process as claimed in claim 16, wherein the linear formal is methylal.

* * * * *